US012798818B2

(12) United States Patent
Miles et al.

(10) Patent No.: US 12,798,818 B2
(45) Date of Patent: Nov. 17, 2026

(54) METHOD AND APPARATUS FOR PROCESSING PLASTIC LINER BAGS

(71) Applicant: Powder Projects Limited, Hamilton (NZ)

(72) Inventors: Richard John Miles, Hamilton (NZ); Jeffrey Robert Dance, Hamilton (NZ)

(73) Assignee: Powder Projects Limited, Hamilton (NZ)

( * ) Notice: Subject to any disclaimer, the term of this patent is extended or adjusted under 35 U.S.C. 154(b) by 0 days.

(21) Appl. No.: 18/573,800

(22) PCT Filed: Jun. 23, 2022

(86) PCT No.: PCT/NZ2022/050081
§ 371 (c)(1),
(2) Date: Dec. 22, 2023

(87) PCT Pub. No.: WO2022/271039
PCT Pub. Date: Dec. 29, 2022

(65) Prior Publication Data

US 2024/0228097 A1 Jul. 11, 2024

(30) Foreign Application Priority Data

Jun. 23, 2021 (NZ) ........................................ 777325

(51) Int. Cl.
*B65B 69/00* (2006.01)
*B26D 1/09* (2006.01)
(Continued)

(52) U.S. Cl.
CPC ...... *B65B 69/0008* (2013.01); *B65B 69/0033* (2013.01); *B65B 69/0058* (2013.01);
(Continued)

(58) Field of Classification Search
CPC ............ B65B 69/0008; B65B 69/0058; B65B 61/005; B65B 61/18; B65B 69/0033; B65B 69/0075; B26D 1/095; B26F 1/18
See application file for complete search history.

(56) References Cited

U.S. PATENT DOCUMENTS 1,656,415 A * 1/1928 Breitkrentz ............ B26D 3/185
30/303
1,771,797 A * 7/1930 Lewis ..................... B28C 7/064
414/412
(Continued)

FOREIGN PATENT DOCUMENTS

CN 111170021 A * 5/2020 ......... B65B 69/0008
CN 120039490 A * 5/2025 ............. B65G 53/50
(Continued)

OTHER PUBLICATIONS

International Search Report and Written Opinion issued in PCT Application No. PCT/NZ2022/050081 on Aug. 31, 2022.

*Primary Examiner* — Veronica Martin
*Assistant Examiner* — Mobeen Ahmed
(74) *Attorney, Agent, or Firm* — LeonardPatel PC; Michael A. Leonard II; Sheetal S. Patel

(57) ABSTRACT

A method and apparatus for opening of a plastic bag containing a food product in the form of powder or similar fine particulate material is disclosed. The bag is positioned atop a plate with a plurality of slots, with at least one slot transverse to the others. Beneath the plate, a bag opener is provided that includes a plurality of blades, with at least one blade transverse to the others. The plastic bag is penetrated with aeration spears and pressurized. The bag opener is moved relative to the plate such that the blades pass through the slots and open the bag. The plate is then allowed to pivot downwards, allowing its contents to be emptied into a hopper beneath the plate.

23 Claims, 6 Drawing Sheets

(51) Int. Cl.
*B26F 1/18* (2006.01)
*B65B 61/00* (2006.01)

(52) U.S. Cl.
CPC .......... *B65B 69/0075* (2013.01); *B26D 1/095* (2013.01); *B26F 1/18* (2013.01); *B65B 61/005* (2013.01)

(56) References Cited

U.S. PATENT DOCUMENTS 2,796,184 A * 6/1957 Marion ............... B65B 69/0008 414/412
3,664,530 A * 5/1972 Takiguchi ........... B65B 69/0008 414/412
3,884,375 A * 5/1975 Schott, Jr. ........... B65B 69/0008 414/412
4,134,508 A * 1/1979 Burdett, Jr. ......... B65B 69/0008 414/412
4,207,021 A * 6/1980 Burdett, Jr. ......... B65B 69/0008 414/412
4,289,438 A * 9/1981 Murer ................. B65B 69/0008 414/412
4,390,313 A * 6/1983 Hoehn ................ B65B 69/0033 414/412
4,627,781 A * 12/1986 Borgner .............. B65B 69/0008 141/330
4,903,902 A * 2/1990 Hufnagel ................. B26D 1/09 241/95
5,095,794 A * 3/1992 Mendenhall ......... B26D 1/0006 83/402
5,368,431 A * 11/1994 Willey ................ B65B 69/0008 414/412
5,443,347 A * 8/1995 Weinlader ........... B65B 69/0008 414/412
5,474,111 A * 12/1995 Williamson ........... B65G 53/26 141/330
5,613,824 A * 3/1997 Kato ................... B65B 69/0008 141/330
6,293,318 B1 * 9/2001 Schmidt .............. B65B 69/0008 141/330
9,162,788 B2 * 10/2015 Stone .................. B65B 69/0025
10,899,025 B2 * 1/2021 Crichton .................. B26D 3/08
10,946,129 B2 * 3/2021 Gillespie ............. A61M 1/1666
10,981,687 B2 * 4/2021 Held .......................... B26F 3/06
11,760,523 B2 * 9/2023 Werfring ............. B65B 69/0008 414/412
2004/0055438 A1 * 3/2004 Ours ................... B65B 69/0033 414/412
2004/0188457 A1 * 9/2004 Galomb .............. A01M 9/0069 222/1
2008/0229938 A1 * 9/2008 Hutto ...................... A47J 9/005 83/13
2008/0264284 A1 * 10/2008 Hutchison ............... B44B 5/026 101/394
2009/0304463 A1 * 12/2009 Dance ................. B65B 69/0008 406/122
2020/0047359 A1 * 2/2020 Schenk ...................... B26B 3/04
2021/0114761 A1 * 4/2021 Pennington ......... B65B 69/0008
2021/0309404 A1 * 10/2021 Werfring ................ B25J 9/0093
2024/0198551 A1 * 6/2024 Birkedal .............. B26D 1/0006

FOREIGN PATENT DOCUMENTS

DE 20012769 U1 * 3/2001 ......... B65B 69/0033
GB 2537407 A 10/2016
JP 2015231843 A * 12/2015 ............. B65B 69/00
WO 2007021201 A1 2/2007

* cited by examiner

METHOD AND APPARATUS FOR PROCESSING PLASTIC LINER BAGS

CROSS-REFERENCE TO RELATED APPLICATIONS

This application is a U.S. national stage application under 35 U.S.C. § 371 of PCT Application No. PCT/NZ2022/050081 filed Jun. 23, 2022, which claims the benefit of New Zealand Patent Application No. 777325 filed Jun. 23, 2021. The subject matter of these earlier filed applications is hereby incorporated by reference in its entirety.

FIELD

The present invention generally relates to the handling and processing of large double-layered bags having an outer coarse paper bag and an inner plastic liner bag containing powder or fine particulate material. The invention has particular application to the processing and emptying of the plastic liner bag.

BACKGROUND

In the food industry, it is common practice to store food products such as milk powder or flour in large double-layered bags known as Kraft bags. This type of bag has an outer layer which provides a degree of protection for the food product during transportation and storage and an inner layer to ensure that the food product is contained therein within a hygienic environment. This is particularly important should the outer layer be damaged or become dirty or otherwise contaminated.

In most cases, the outer layer of the Kraft bag is one to three plies of Kraft paper, while the inner layer is in the form of a plastic liner bag. When a Kraft bag is being processed, for example by being introduced to a food manufacturing facility, the outer layer of paper is removed. This leaves the sealed plastic liner bag containing the food product, which could be in an amount of at least 10 kilograms, and often 20 kilograms or more, to be emptied into a suitable vessel or container. This latter step is typically performed in a hygienic area of the food manufacturing facility.

During the process of removing the outer layer of paper and then transporting the plastic liner bag to the hygienic area of the food manufacturing facility, it is important that the plastic liner bag does not come in contact with dirt, pathogens, and other contaminants. It is clearly undesirable for such contaminants to enter the food chain via being inadvertently introduced to the contents of the plastic liner bag during the opening process.

Once at its final destination, typically a bag opening station, the plastic liner bag is opened to deposit its contents into a hopper or container or the like. Once emptied, the plastic liner bag is removed to waste.

Opening of the plastic liner bag typically involves placing it into a substantially vertical orientation and then cutting along or proximate the wider side of the bag, proximate its bottom. The bottom, which has at least one side still attached to the bag such that it is similar to a flap, then falls away, allowing the contents of the plastic liner bag to flow into the hopper. However, this is not always efficient as some of the contents of the plastic liner bag become trapped in the corners of the flap and may not fall into the hopper.

In some facilities, the bag opening process may be automated. However, this requires equipment to optimize the placement and tilting of the bag into a vertical orientation, particularly when the bags are delivered to the bag opening station via a conveyor. Consideration must also be given to the potential shifting of the contents of the bag, and for powder becoming trapped in the corners of the bag. This may lead to wastage of the food product contained in the bag if they cannot be transferred to the vessel into which the bag is being emptied.

These factors mean that it can be relatively difficult to automate the opening of the plastic liner bag. Therefore, it is more typical that the opening of the plastic liner bag be performed manually, by human workers who are required to be dressed appropriately for the hygienic area of the food manufacturing facility.

However, this is not ideal since it means that the opening of the plastic liner bag is then subject to the physical abilities and limitations of the workers. Hygiene standards cannot be guaranteed or consistent, and a completely sterile environment for opening the plastic liner bags is unlikely to be achievable when this task is performed by a human workforce. Furthermore, the overall throughput of the food manufacturing facility can be affected by the working hours available, downtime through rest breaks, and absenteeism.

Care must also be taken when opening the plastic liner bag, particularly if instruments are used to assist in the process. Such instruments typically are knives or similar sharp implements, and often, multiple cuts are made to increase the width of the opening and facilitate rapid emptying of the bag. If care is not taken, it is possible to inadvertently cut loose fragments of plastic material. Therefore, the use of these instruments runs the risk of plastic material entering the powder if the user does not take sufficient care.

There is also the potential risk of injury to the workers and further, of contamination of the powder, should such an injury occur (e.g., a cut to the skin). Even with the best hygienic measures, workers can contaminate the powder in other ways; for example, through body hair, skin detritus, and bodily fluids such as saliva or sweat. Accordingly, an improved and/or alternative approach may be beneficial.

SUMMARY

Certain embodiments of the present invention may provide solutions to the problems and needs in the art that have not yet been fully identified, appreciated, or solved by current bag processing technologies. For example, some embodiments of the present invention pertain to methods and apparatus for opening of a plastic bag containing a food product in the form of powder or similar fine particulate material.

According to a first aspect, there is provided a method of processing a plastic liner bag filled with contents. The method including the steps of positioning a lower surface of the plastic liner bag on a plate configured with at least two slots, wherein the at least two slots are substantially perpendicular to each other, penetrating a surface of the plastic liner bag with one or more aeration spears, inflating the plastic liner bag and fluidizing its contents with a gas delivered from the one or more aeration spears, and cutting the lower surface of the plastic liner bag with a bag opener. The bag opener is configured with at least two blades that are substantially perpendicular to each other and pass through the slots of the plate.

According to a further aspect, there is provided an apparatus for processing a plastic liner bag filled with contents. The apparatus includes a plate to receive the plastic liner bag and one or more aeration spears arranged to penetrate a surface of and deliver a gas into the plastic liner bag. The apparatus also includes a bag opener configured to open the plastic liner bag and a vessel arranged beneath the plate to receive the contents of the plastic liner bag once opened. The plate is configured with at least two slots that are substantially perpendicular to each other. The bag opener is arranged beneath the plate and is configured with at least two blades that are substantially perpendicular to each other and, in use, pass through the slots of the plate.

According to a further aspect, there is provided a bag opener for use with an apparatus for processing a plastic liner bag substantially as described above. The bag opener includes at least two blades that are substantially perpendicular to each other.

According to a further aspect, there is provided a plate for use with an apparatus for processing a plastic liner bag substantially as described above. The plate includes at least two slots that are substantially perpendicular to each other.

Per the above, embodiments of the present invention relate to methods and apparatus for the processing of large double layered bags. The bags having an outer coarse paper bag protecting an inner layer in the form of a plastic bag containing food product in the form of powder or similar fine particulate material. This plastic bag, which can contain 10 kilograms or more of food product, shall now be referred to as a plastic liner bag. Such embodiments particularly relate to the opening of the plastic liner bag and the emptying of its contents following earlier removal of the outer paper bag.

In the packaging industry, Kraft paper is often used for these large double layered bags. Reference shall now be made throughout the remainder of the present specification to these types of bags being Kraft bags.

However, although reference is made to the Kraft bag having an outer layer of paper, i.e., a single layer of paper, this should not be interpreted as limiting. In some Kraft bags, such as step top glued bags, the outer layer of paper may be comprised of two or more plies, i.e., individual layers, of paper. Collectively, these should be understood to comprise the outer layer of the bag.

The Kraft bags with which such embodiments may be used are often used to store and transport powered product. In some embodiments, the powdered product is a dairy food powder such as milk powder, and reference to this effect shall now be made throughout the remainder of the present specification. However, this is not intended to be limiting and such embodiments may alternatively be used for other food powders, whether dairy or non-dairy (such as flour or the like).

Some embodiments are intended for use with Kraft bags that are used to store and transport up to 25 kilograms worth of milk powder. Such bags may be approximately 850 millimeters long, 450 millimeters wide, and 160 millimeters high. These dimensions are provided by way of example and are not meant to be limiting.

The Kraft bag, both in respect of the outer paper layer and the inner plastic liner bag, should be understood to have a base end and a top end and four elongate sides. The elongate sides generally are arranged in pairs, namely, a narrow pair (forming the depth of the bag) and a wide pair (forming the width of the bag). In the above example, the narrow sides may be approximately 850 millimeters by 160 millimeters and the wide sides may be approximately 850 millimeters by 450 millimeters.

Reference in the ensuing disclosure of the invention to the plastic liner bag being placed horizontally should be understood to mean that it has been placed on one of its wide sides. In this configuration, the bag can be said to be laid flat on its lower side.

Embodiments should be understood to be part of a facility that processes Kraft bags. It will be appreciated that such embodiments are suitable for use in facilities such as a factory manufacturing or processing food products where milk powder is a key or main ingredient of the food products. In these facilities, the opening of the plastic liner bag needs to be performed in a relatively hygienic environment. As such, some embodiments may be adapted for use without human intervention.

Some embodiments are a bag opening station or part of a bag opening station of the facility that opens the plastic liner bag of the Kraft bag. The outer paper layer is removed earlier in the processing of the Kraft bag and the plastic liner bag may have undergone a decontamination process to remove and/or neutralize any contaminants that may be present on its exterior surfaces. For example, the plastic liner bag may have been treated with ultraviolet (UV) light or the like.

In some embodiments, the station is positioned at or proximate the end of a conveyor belt or the like which transports the plastic liner bag to the station.

In some embodiments, the station includes a housing or the like in which the opening of the plastic liner bag is performed. This helps to confine the milk powder contained within the plastic liner bag during the opening process. It will be appreciated that being a powder, a portion of the milk powder will easily become airborne as the plastic liner bag is emptied. Having the opening process completed within a housing limits the airborne distribution of the powder as well as limiting the possibility that airborne contaminants may be entrained with the powder when the plastic liner bag is opened and emptied.

In some embodiments, the station includes a vessel or hopper to receive the contents of the plastic liner bag once it has been opened. The vessel or hopper may be positioned directly under or beneath the housing. However, the vessel or hopper could be laterally placed relative to the housing and the powder delivered via an appropriately orientated chute or ducting extending from the housing.

In some embodiments of the invention, the station includes a mechanically operated pusher or similar device that applies force to a side of the plastic liner bag in order to move it from the conveyor into the housing. This pusher may be arranged within a frame or similar supporting structure proximate the conveyor but on the side opposite to the entry point of the plastic liner bag to the station.

In some embodiments, the station may include mechanically operated pulling means, such as grippers or the like, either in addition to a pusher or instead of a pusher. In these embodiments, the pulling means may be positioned between the conveyor and the housing or within the housing itself. However, it should be appreciated that the pulling means may need to be appropriately engineered to ensure that the risk of damaging the bag is kept to a minimum as the weight of the contents of the bag will place stress on the points of the plastic liner bag that are gripped by the pulling means.

In some embodiments, the pusher and/or pulling means may be used in conjunction with alignment paraphernalia such as lasers or the like to optimize the orientation of the plastic liner bag as it is moved from the conveyor into the housing.

In some embodiments of the invention, there is provided a bag holding means that secures and holds the bag once it enters the housing.

In some embodiments, the bag holding means includes one or more vacuum gripping devices such as will be readily apparent to persons skilled in the art. These are configured to contact and engage with the plastic liner bag once it is in position for opening.

The vacuum gripping devices are particularly helpful in holding the plastic liner bag once it has been emptied. This prevents the empty bag from falling into the vessel into which the powder has been emptied. The vacuum grippers further assist in the removal of the plastic liner bag from the plate, by transferring it to a waste chute or bin or the like, in preparation for clearing the bag opening station in anticipation of the receipt of the next bag to be opened.

The station should be understood to include one or more aeration spears linked or otherwise connected to a displacement means.

An aeration spear should be understood to be an apparatus that includes an elongate hollow tube, an end of which is configured as a tapered tip or similar, and which is configured to pierce the plastic liner bag and deliver or otherwise introduce a compressed gas, such as nitrogen or another inert gas or a blend thereof, to the interior of the plastic liner bag. This action causes a substantial inflation of the bag. It also fluidizes the contents of the bag, which can help with the subsequent emptying of the bag.

The displacement means should be understood to be a mechanism that acts to displace or otherwise move the aeration spear back and forth along an axis of movement. This mechanism may be a piston or similar actuator, readily apparent to a person skilled in the art, to which the aeration spear is mounted.

In some embodiments of the invention, the aeration spears are arranged such that they are above the bag when it is located in the housing. In use, the aeration spears are displaced substantially vertically downwards. It will be appreciated that when the plastic liner bag is present in the housing, downward displacement of the aeration spears will result in penetration of the plastic liner bag.

In some embodiments, the aeration spear includes an outer housing configured as an annular ring and including a series of vacuum points or similar structures.

In use, the housing is applied to the upper surface of the bag and following activation of a suction force via the vacuum points, provided to the surface of the housing that contacts the bag, substantially creates a seal about the perimeter of the ring. Following this, the aeration spear is displaced downwards to penetrate the bag.

The combination of the suction force from the annular ring configuration and with the tapered tip of the spear helps to ensure a gas tight seal, or at least a substantially gas tight seal, is achieved as the plastic is penetrated. The suction force holds the material of the plastic liner bag about the tapered tip of the spear to maintain the seal during the inflation and emptying sequences described below.

In some embodiments, the extent of penetration of the aeration spear is limited to the upper surface of the plastic liner bag.

In some embodiments of the present invention, the aeration spears may be orientated such that they penetrate the side surfaces of the bag in use. When the bag is in position for the operation of the present invention, it will be appreciated that the side surfaces are substantially vertical. However, it should be appreciated that arranging aeration spears to penetrate the side surfaces of the bag may compromise the overall footprint of the bag opening station since allowance will need to be made for the space in which the aeration spears move back and forth, in an angled or horizontal direction of movement, while in operation.

In use, the introduction of a compressed gas, via the aeration spears, inflates the plastic liner bag and fluidizes its contents, helping with the discharge of the powder when the bag is emptied. The inflation of the plastic liner bag places it under tension and ensures a positive pressure is applied to the interior of the bag; it is this which helps with the rapid discharge of its contents.

The station should be understood to include a bag opener that co-operates with a plate to facilitate the opening of the plastic liner bag. It should be appreciated that one of the bag opener or the plate is arranged such that it is moveable relative to the other of the bag opener or the plate.

In some embodiments of the invention, the plate should be understood to be a surface within the housing on which the plastic liner bag is pushed or otherwise located prior to it being opened.

In some embodiments, the plate is substantially horizontal. When the plastic liner bag is placed upon the plate, it rests on one of its wide sides; this side is the lower side of the bag.

In some embodiments of the present invention the plate is configured with a hinging system along one or more of its edges to allow the plate to tip in a vertically downward direction to allow the contents of the plastic liner bag to be deposited into the vessel or hopper below once the bag has been opened by the bag opener.

In certain embodiments, at least a substantial portion of the plate is comprised of a grid or mesh-like structure through which the contents of the plastic liner bag can pass into the vessel below the bag opening station, once it has been opened by the bag opener.

The plate includes at least two slots. It will be appreciated that in use, at least a portion of the bag opener passes through the slots and into the lower side of the plastic liner bag resting on the plate.

In some embodiments of the invention, at least one of the slots of the plate is arranged to be substantially perpendicular, i.e., transverse, to the other of the slots.

In certain embodiments, the plate is configured with three slots. One relatively elongate slot is bisected by two shorter slots equidistantly spaced apart.

In some embodiments, the plate may be a unitary structure, but in certain embodiments is configured as a number of segments that collectively form the plate. In these embodiments, the slots are formed by virtue of the gaps between adjacent segments. It will be appreciated that at least some of the segments may be hinged along one edge to allow them to pivot or otherwise tip in a vertically downward direction, towards the vessel or hopper below the station.

The bag opener includes at least two blades.

In some embodiments of the present invention, the at least two blades of the bag opener are configured with serrations or teeth or the like. In certain embodiments, the at least two blades may be configured with a straight or sharp edge.

In some embodiments of the invention, at least one of the blades is arranged to be substantially perpendicular, i.e., transverse or at right angles, to the other of the blades. It should be appreciated that that the blades of the bag opener are substantially complementary in orientation and alignment to the slots of the plate.

In some embodiments, the bag opener is configured with three blades. One relatively elongate blade is bisected by two shorter blades spaced equidistantly apart. This arrangement assumes a substantially H-shaped profile in plan view.

It should be appreciated that in some embodiments, the length of the blades may be formed from two or more segments. This may mean that the bag opener comprises at least five blades, one for each element of the H-shaped profile.

In certain embodiments, the bag opener is configured with three blades. Two relatively elongate blades are spaced equidistantly apart and bisected by one shorter blade. Similar to the previous embodiment, in this arrangement, the bag opener assumes a substantially H-shaped profile in plan view. In this embodiment, the length of the blades may be formed from two or more segments. This may mean that the bag opener comprises at least five blades.

In some embodiments of the present invention, the blades of the bag opener are configured to move up through the slots of the plate to contact the lower side of the plastic liner bag. In these embodiments, the bag opener is provided with a displacement means to advance and withdraw the blades relative to the plate.

The displacement means of the bag opener should be understood to mean a piston or actuator as will be readily apparent to a person skilled in the art. In some embodiments, the blades of the bag opener may be mounted to a frame or chassis on which the displacement means act to cause movement.

In certain embodiments of the present invention, the plate may be lowered such that the blades of the bag opener move through the slots. In such embodiments, the plate may be mounted to a frame or chassis on which a displacement means may act to lower and raise the plate relative to the blades of the bag opener.

It will be appreciated that with the surface of the bag under tension, by virtue of being inflated via the gas delivered by the aeration spears, it may be easier to apply a piercing force to the bag. This is even more so as the pressure of the compressed gas may urge the material of the bag into the slots of the plate. The blades contact the underside of the bag in a vertical direction, slicing it open without the need for a horizontal cutting action. The inflation of the bag, which urges the lower surfaces of the bag into the slots of the plate, helps with ensuring a clean cut.

Furthermore, the complementary arrangement of the plate and bag opener means that the lower side of the plastic liner bag is cut into a series of flaps, each flap being hinged to the sides of the bag along one edge. This helps with efficient opening and emptying of the bag while at the same time reducing the risk of fragments of plastic material becoming entrained within the powder as the bag is emptied.

It will be appreciated that the present invention may be readily partially or fully automated through the inclusion of a control system comprising a programmable logic controller (PLC) or similar device. In such embodiments, the PLC may receive inputs from the conveyor and bag opening station, and in response trigger the appropriate action, such as movement of the pusher, operation of the door of the housing, displacement and actuation of the aeration spears, movement of the bag opener or plate, hinging of the plate and operation of a pneumatic conveying means to transfer the empty plastic liner bag to a waste bin.

Further aspects of the invention, which should be considered in all its novel aspects, will become apparent to those skilled in the art upon reading of the following description which provides at least one example of a practical application of the present invention.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION

Some embodiments pertain to methods and apparatus for opening a plastic bag containing a food product in the form of powder or similar fine particulate material. The bag is positioned atop a plate with a plurality of slots, with at least one slot transverse to the others. Beneath the plate, a bag opener is provided that includes a plurality of blades, with at least one blade transverse to the others. The plastic bag is penetrated with aeration spears and pressurized. The bag opener is moved relative to the plate such that the blades pass through the slots and open the bag. The plate is then allowed to pivot downwards, allowing its contents to be emptied into a hopper beneath the plate.

It is an object of some embodiments to provide a method and apparatus for the processing and emptying of a plastic liner bag from which an outer coarse paper bag has been removed. It is an object of certain embodiments to provide a method and apparatus for the automated, or near automated, processing and emptying of a plastic liner bag from which an outer coarse paper bag has been removed. It is an object of some embodiments to provide a method and apparatus for the efficient emptying of a plastic liner bag from which an outer coarse paper bag has been removed. It is an object of certain embodiments to provide a method and apparatus for the automated emptying of a plastic liner bag without having to tilt the bag into a vertical or near vertical orientation. It is an object of some embodiments to provide a method and apparatus for the opening of a plastic liner bag from which an outer coarse paper bag has been removed without having portions of plastic material becoming entrained with the contents of the bag as it is emptied. It is an object of certain embodiments to at the very least provide the public with a useful choice.

Figure 1:
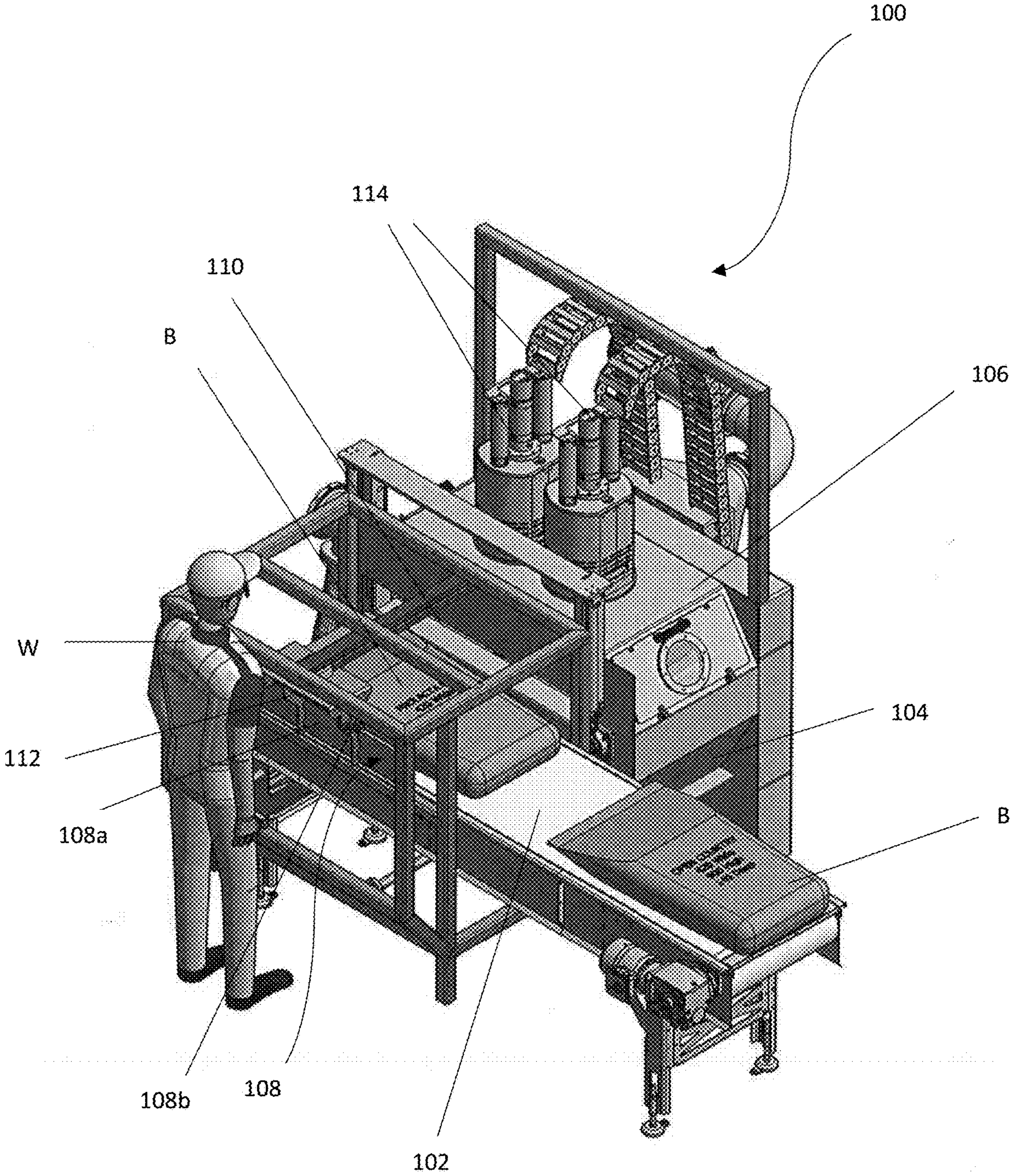
FIG. 1 is a perspective view of a bag opening station and conveyor according to one aspect of the present invention.
Figure 2:
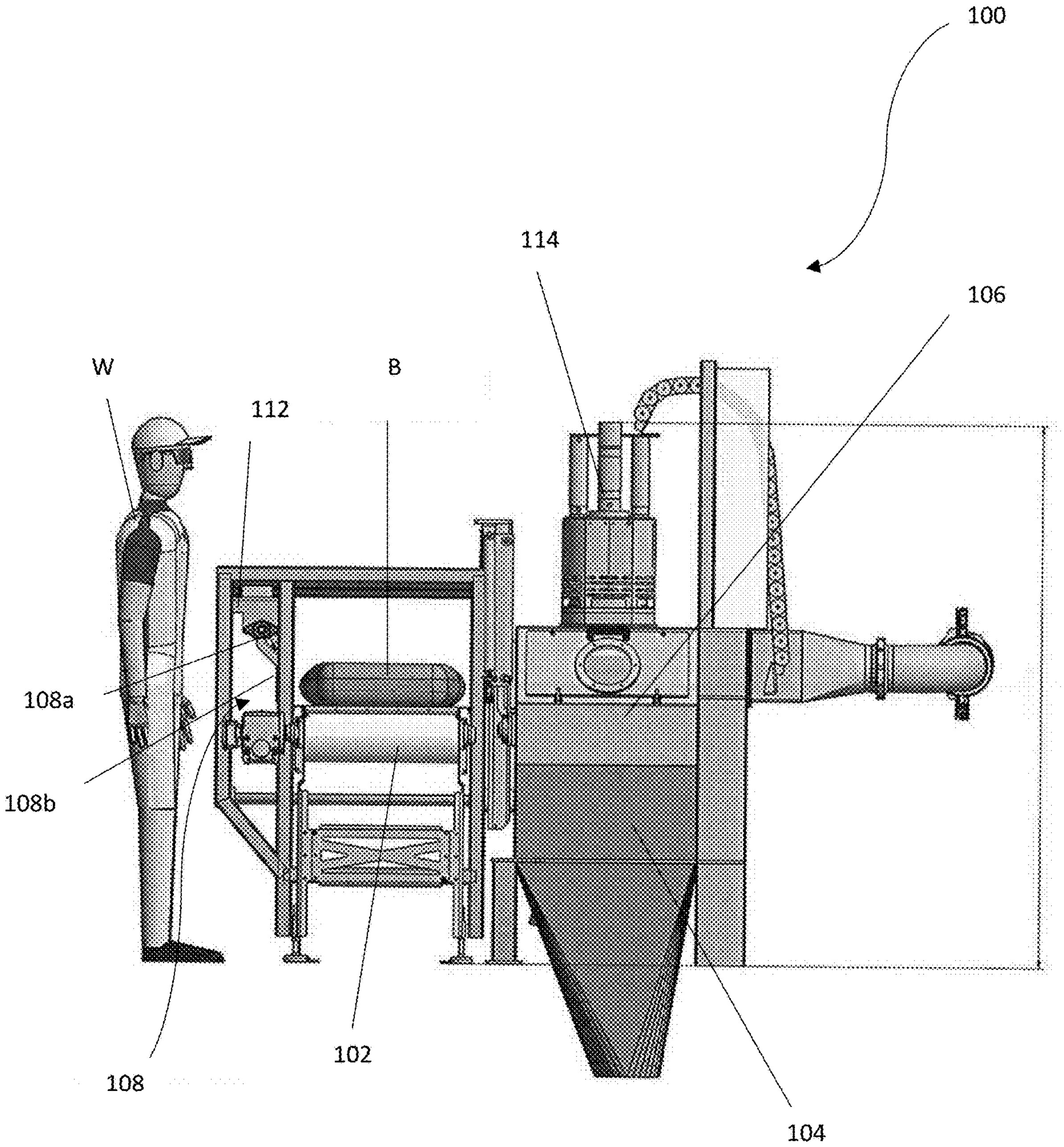
FIG. 2 is an end view of the bag opening station of FIG. 1.

An embodiment of the present invention is shown in FIGS. 1 and 2 as part of a bag opening station (generally indicated as 100) in a facility processing Kraft bags B. These types of bags have an outer bag of paper protecting an inner plastic liner bag that contains a food powder.

For the sake of describing an embodiment and the method of its use, reference shall now be made to the food powder being milk powder but it should be understood that this is not meant to be limiting. In certain embodiments the food powder may be flour or icing sugar, for example. As with milk powders, these powdered products are often referred to as being "sloppy" and are very fluid in the plastic liner bag such that they may easily flow.

The facility processing Kraft bags may be a food manufacturing plant or the like which requires a suitably hygienic environment in which the food is made and prepared. For example, the facility may be a manufacturer of infant formula which have multiple powdered constituents, such as the milk powders whey and casein, to be brought together and blended. Prior to doing so, each of the constituents are provided to the facility in Kraft bags which must therefore be processed and emptied.

As part of the bag handling process, the outer paper bag of the Kraft bag B has already been removed and the plastic liner bag placed on a conveyor 102. The conveyor may be a belt-type conveyor, as depicted in FIG. 1, or one using a plurality of segmented plates, depending on the preferred configuration.

The conveyor 102 transports the plastic liner bag B to the bag opening station 100 which, to avoid or minimize contamination of the contents of the bag, may be located in a more hygienic section of the facility for opening and emptying. At the bag opening station, the milk powder contained in the plastic liner bag is emptied into a suitable vessel, such as a hopper 104. In FIG. 2, the hopper can be seen beneath the bag opening station.

As can be seen in FIG. 1, a series of plastic liner bags B approach the bag opening station 100 via the conveyor 102. Each plastic liner bag has been located such that it is laid on its wider side, horizontally on the conveyor.

As shown in FIGS. 1 and 2, the bag opening station 100 includes a large housing 106, adjacent to the conveyor 102, within which the opening and the emptying of the plastic liner bag B is performed. The presence of the housing 106 also acts to minimize and confine any airborne distribution of the milk powder contained in the bag B as it is opened and emptied. This minimizes any loss of the milk powder.

In the illustrated example, the bag opening station 100 includes an orientation system 108 to ensure correct alignment of the plastic liner bag B prior to it being transferred from the conveyor 102 into the housing 106. The orientation system may use lasers 108*a* or the like to help determine whether the plastic liner bag is in the appropriate position for transfer. Upon the lasers detecting the presence of the bag, the orientation system may issue a signal that prompts the conveyor to be momentarily paused to allow the transfer of the bag B into the housing to take place.

In the illustrated example, the orientation system 108 includes a pusher 108*b* which urges against the side of the plastic liner bag in order to transfer it from the conveyor 102 and into the housing 106 for the opening procedure to take place.

As shown in FIG. 1, the housing 106 includes a door 110 proximate the conveyor 102. Upon a plastic liner bag B reaching the area adjacent the door and subject to being correctly orientated, the door is opened and the pusher 108*b* moves the plastic liner bag into the housing. The pusher then retracts and the door to the housing is closed, thereby substantially sealing the housing in preparation for the opening and emptying of the plastic liner bag.

In the example of FIG. 1, a worker W operates the pusher by activating a switch that is present on an operating panel 112. This means the worker does not contact the bag B itself, thus eliminating a potential source of contamination. However, it should be appreciated that part of or the entire bag opening process may be automated through the use of an appropriately programmed control system incorporating a programmable logic controller (PLC) or the like.

For example, in an embodiment not illustrated here, the PLC may control the advance of the conveyor, the location of the bags B being monitored though the use of lasers or similar equipment which detect and measure the length and width of the plastic liner bag. Once the plastic liner bag has been determined to be in the correct position to be transferred into the housing of the bag opening station, the door is opened and the pusher applied to the bag by the PLC to move it through the door of the housing and into the appropriate position for the bag opening process. The door is then closed behind and the conveyor resumes its advance, bringing another bag to the bag opening station.

Although the plastic liner bag B is shown in FIGS. 1 and 2 orientated such that its elongate dimension is in line with the direction of travel of the conveyor 102, this is not essential. The plastic liner bag could be placed such that its shorter dimension is in line with the direction of travel of the conveyor, subject to the overall width of the conveyor. It will be appreciated that in this instance, the pusher 108*b* may act upon the top or base of the bag into order to move it into the bag opening station 100.

Integrated into the upper portion of the housing are a pair of aeration spears 114. These are elongate structures with a piercing tip (not visible in FIGS. 1 and 2) that can be displaced downwards, into the housing 106. The spears are hollow and conduct a compressed gas.

The interior of the housing 106 includes a plurality of vacuum grippers (not visible in FIGS. 1 and 2) which, once the plastic liner bag B has been transferred into the housing, contact its outward facing surfaces. These apply a suction force to secure the plastic liner bag in preparation for opening. The use of vacuum grippers for securing plastic liner bags is widely used in the bag processing industry and persons skilled in the art will readily implement such arrangements.

Once it has been transferred to the housing 106, the plastic liner bag B rests on a substantially horizontal plate (not visible in FIG. 3).

The plate includes a plurality of slots. These slots are formed by virtue of the plate being formed from a plurality of segments rather than as a one-piece and unitary structure. At least some, preferably all, of the segments have an edge that is provided with a hinging means connecting it to the surrounding housing structure. The hinging means is such that it allows the segment to be able to pivot downwards.

In exemplary embodiments, the plate is configured with three slots-one relatively elongate slot, with two shorter slots arranged perpendicular to, and bisecting, the elongate slot. This means that the plate is effectively made up of six segments. However, it should be appreciated that in some examples, the plate may only be provided with two slots, transverse to each other, such that the plate is only made up of four segments.

Figure 3A:
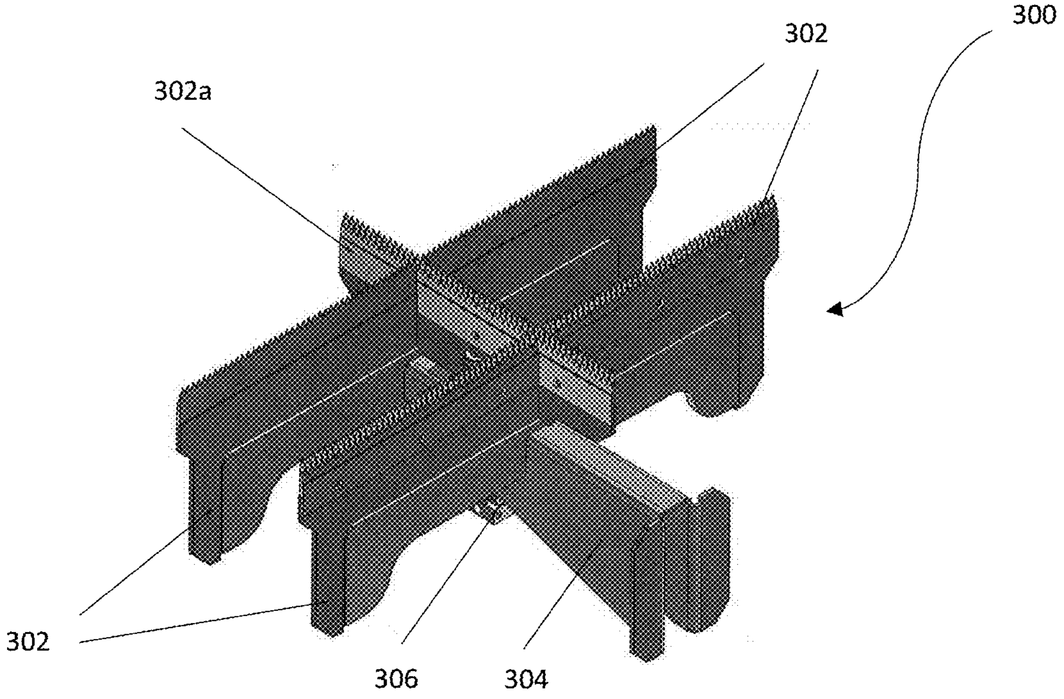
FIG. 3A is an upper perspective view of the bag opener according to one aspect of the present invention.
Figure 3B:
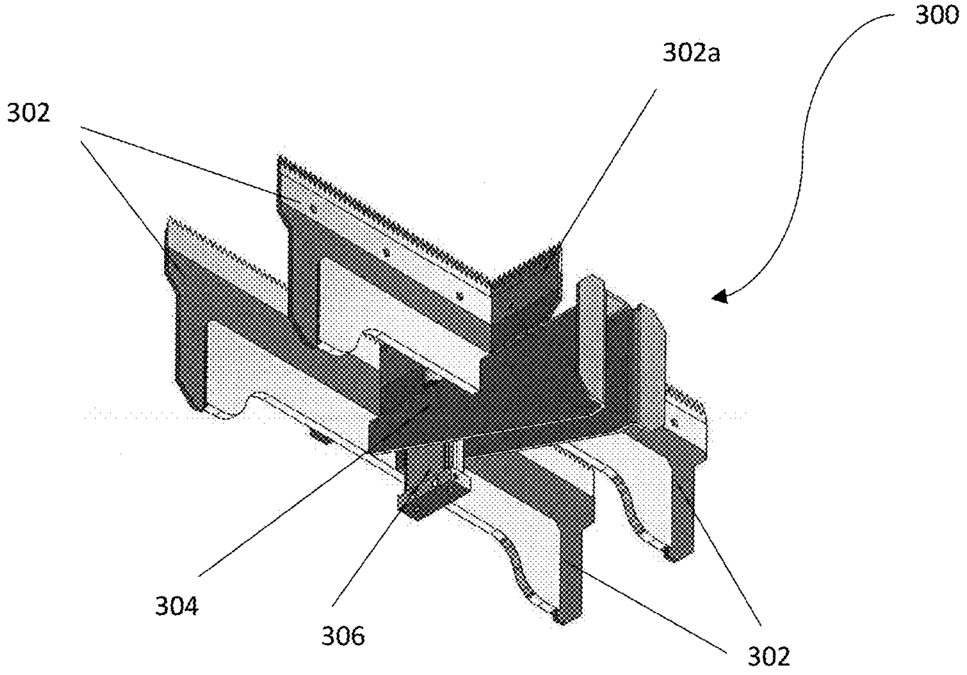
FIG. 3B is a lower perspective view of the bag opener according to one aspect of the present invention.

It will be appreciated that the slots of the plate are substantially in correspondence with the blades of the bag opener 300, which is shown in FIGS. 3A and 3B, from the upper and lower sides respectively. As can be seen, the bag opener includes a plurality of serrated cutting blades 302, 302*a* mounted to a frame 304 linking the blades such that the bag opener forms a unitary structure.

As seen in FIGS. 4A, 4B, 5 and 6, the bag opener 300 is positioned within the lower portion of the bag opening station 100 (housing omitted for sake of clarity), below the plate 400. In this example, it is positioned above the entrance to the hopper 104 but in other examples, it may be positioned in the mouth of the entrance to the hopper.

Returning to FIGS. 3A and 3B, the bag opener 300 is linked to a support structure (not visible) via a piston 306. The piston causes movement of the frame 304 and the cutting blades 302 mounted thereto upwards and away from the support structure.

In the embodiment illustrated in FIGS. 3A and 3B, the bag opener is formed from five blades, one 302*a* of which is perpendicular or transverse to the other four blades 302. However, it should be appreciated that in some embodiments, the bag opener may be formed from two or three interlocking blades.

Given its central position, the transverse blade 302*a* is connected to the piston 306. This ensures relatively equal distribution of forces across the length of the blades 302 as they contact the plastic liner bag during the opening process.

The use of the invention shall now be described with reference to FIGS. 4A, 4B, 5 and 6. The plastic liner bag B containing milk powder approaches the bag opening station 100 along the conveyor (not shown). Once it has reached the appropriate position, it is then transferred into the housing (not shown), either manually or automatically.

Figure 4A:
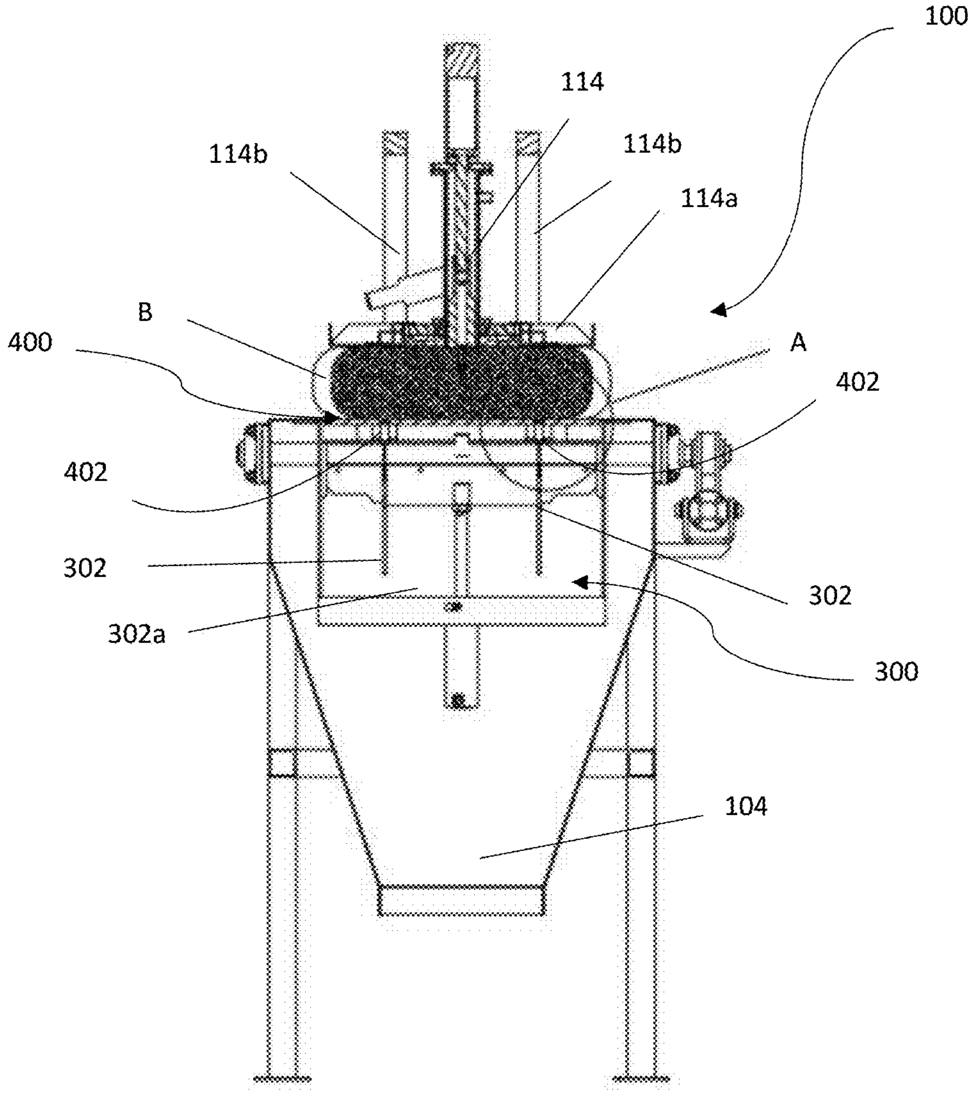
FIG. 4A is a cross-sectional view of the bag opening station of FIGS. 1 and 2 during inflation of a bag.
Figure 4B:
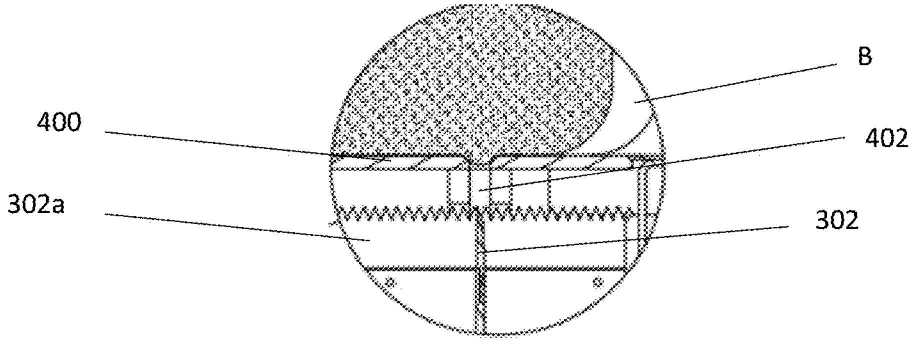
FIG. 4B is a detail view of FIG. 4A.

As shown in FIG. 4A, when in the housing (not shown), the aeration spear 114 (only one is shown in this figure) is displaced vertically downwards such that its tip penetrates the upward facing side of the plastic liner bag B. The housing 114*a* surrounding the spear is provided with vacuum grippers 114*b*. This is to create an adequate and robust seal around the entry point of the spear into the plastic liner bag. A supply of compressed gas, such as nitrogen, preferred since it is biologically inert and will not affect the powder, is then introduced to the plastic liner bag via the aeration spears.

As the entry point of the aeration spear 114 is effectively sealed by the housing 114*a* and vacuum grippers 114*b*, the effect of the compressed gas is to inflate the plastic liner bag B and fluidize its contents. The inflation urges the lower side of the plastic liner bag into the slots 402 of the plate 400, best seen in FIG. 4B, a detail view of the area identified as A in FIG. 4A, increasing the surface tension of the material of the bag. This means that the cutting of the plastic liner bag, even by a relatively small piercing force, is relatively efficient.

Figure 5:
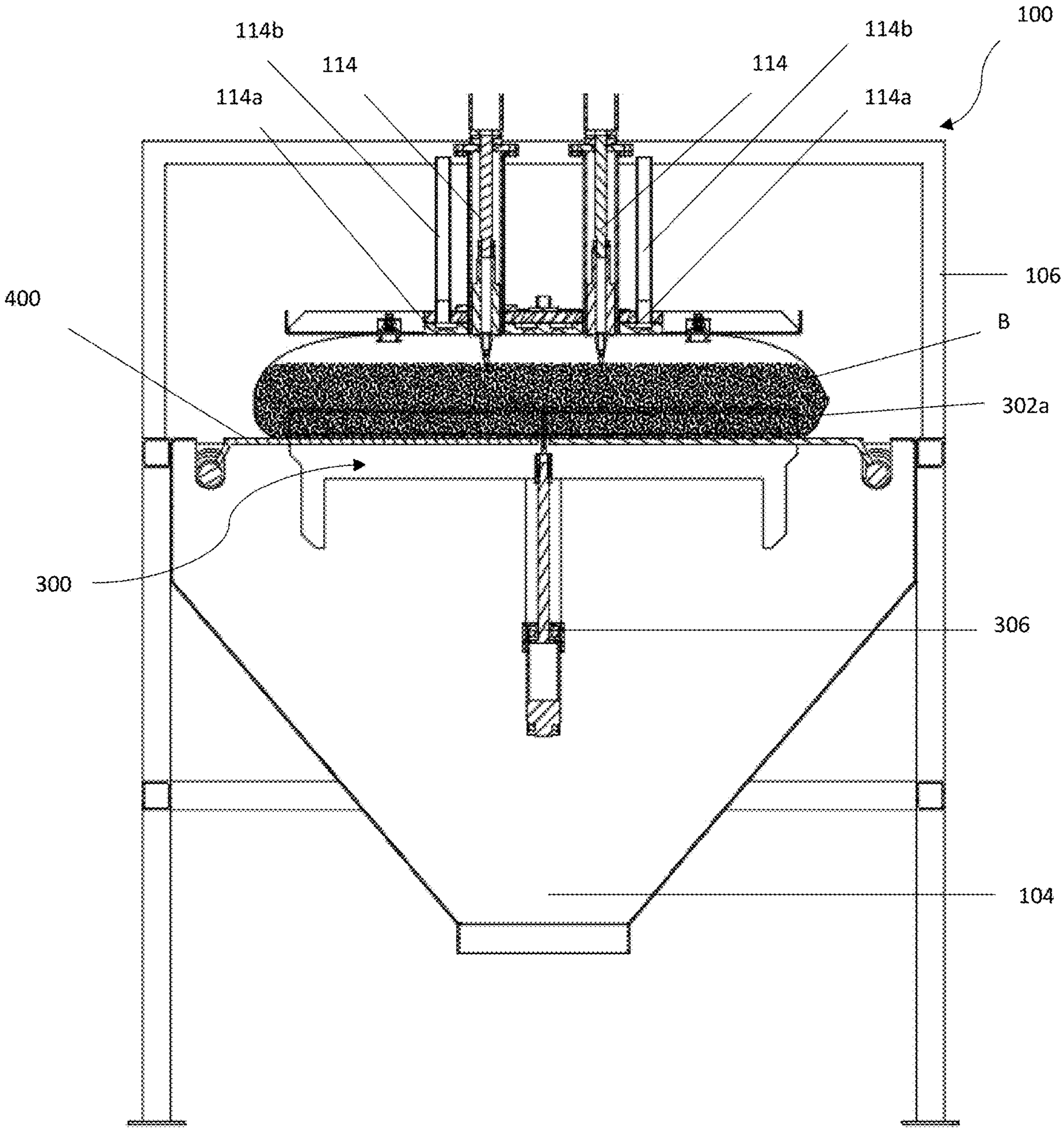
FIG. 5 is a cross-sectional view of the bag opening station of FIG. 4A during operation of the bag opener to open the bag.

Turning to FIG. 5, in which the housing 106 is shown and instead of a single aeration spear, two are depicted, the next step in the bag opening process is the advancement of the bag opener 300 upwards such that at least a portion of its cutting blades 302 enter and pass through the slots (402 in FIG. 4B) to pierce the lower surface of the plastic liner bag B, thereby opening it. The surface of the bag, being placed under considerable tension due to being inflated, is easily pierced.

Figure 6:
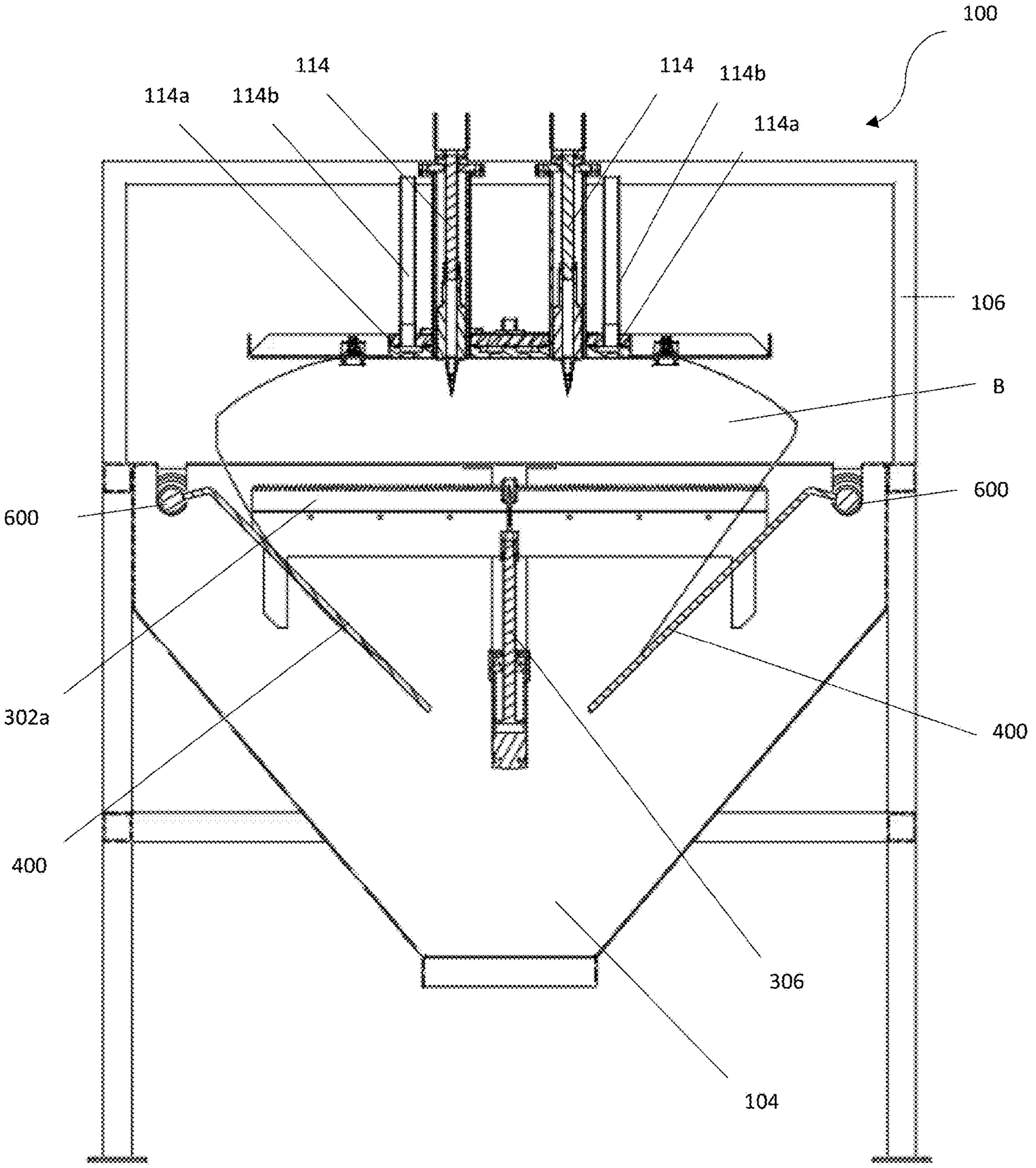
FIG. 6 is a cross-sectional view of the bag opening station of FIGS. 4A and 5 as the bag is emptied.

The bag opener 300 is then withdrawn and the plate 400 allowed to pivot downwards about hinge points 600 as shown in FIG. 6. This allows the milk powder contained within the bag B to be emptied into the hopper 104 positioned beneath the bag housing station 100. The aeration spears 114 are now surplus to requirements and may also be withdrawn. However, in some examples, they may continue to emit compressed gas as they are withdrawn to help clear any powder that may have been caught by surfaces within the bag opening station, such as the plate or the piston 306 or support structure (not shown) of the bag opener 300.

The use of the vacuum grippers 114*b* in the housing 114*a* to secure the plastic liner bag B means that it does not enter the hopper 104. Instead, the vacuum grippers remove the bag from the housing 106 by dropping into a waste chute (not shown).

An advantage of some embodiments is that the bag opener 300, with its arrangement of five blades 302, 302*a* in the exemplary embodiment, operates in such a way that the lower surface of the plastic liner bag B is cut into a group of flaps. Each flap remains connected to the remainder of the bag along at least one edge. This means that there is little or no risk of any separate plastic elements entering the hopper 104, into which the plastic liner bag's contents are emptied. It also helps maximize the efficiency of the emptying process since it optimizes the elimination of any powder that has collected in the corners of the plastic liner bag.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this specification is not, and should not be taken as, an acknowledgement or any form of suggestion that that prior art forms part of the common general knowledge in the field of endeavor in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of processing a plastic liner bag filled with contents, the method comprising the sequential steps of:

(a) positioning a lower surface of the plastic liner bag on a plate configured with at least three slots comprising a first slot, a second slot, and a third slot, wherein the first slot is relatively elongate and perpendicular to the second slot and the third slot, and wherein the second slot and the third slot are spaced equidistantly apart and bisect the first slot;

(b) penetrating a surface of the plastic liner bag with one or more aeration spears;

(c) inflating the plastic liner bag with a gas delivered from the one or more aeration spears, thereby fluidizing the contents; and (d) cutting the lower surface of the inflated plastic liner bag with a bag opener, wherein the bag opener is configured with at least three blades comprising a first blade, a second blade, and a third blade, the first blade is relatively elongate and perpendicular to the second blade and the third blade, the second blade and the third blade are spaced equidistantly apart and bisect the first blade, and the first blade, the second blade, and the third blade pass together through the slots of the plate.

2. The method as claimed in claim 1, wherein the plastic liner bag is pushed onto the plate.

3. The method as claimed in claim 1, wherein the one or more aeration spears are displaced vertically downwards to penetrate the plastic liner bag.

4. The method as claimed in claim 1, wherein a seal is formed around the penetrated surface of the plastic liner bag prior to inflating the plastic liner bag.

5. The method as claimed in claim 1, wherein the gas is an inert gas.

6. The method of claim 1, wherein the bag opener is moved vertically upwards relative to the plate to cut the lower surface of the bag.

7. The method of claim 1, wherein the plate is moved vertically downwards relative to the bag opener to cut the lower surface of the bag.

8. The method of claim 1, further comprising:

after the plastic liner bag has been cut, pivoting at least a portion of the plate downwards to empty the plastic liner bag.

9. The method as claimed in claim 1, wherein the contents of the plastic liner bag comprise milk powder.

10. An apparatus, comprising:

a plate to receive the plastic liner bag;

one or more aeration spears arranged to penetrate a surface of and deliver a gas into the plastic liner bag;

a bag opener configured to open the plastic liner bag; and a vessel arranged beneath the plate to receive the contents of the plastic liner bag once opened, wherein the plate is configured with at least three slots comprising a first slot, a second slot, and a third slot, the first slot is relatively elongate and perpendicular to the second slot and the third slot, the second slot and the third slot are spaced equidistantly apart and bisect the first slot, the bag opener is arranged beneath the plate and is configured with at least three blades comprising a first blade, a second blade, and a third blade, the first blade is relatively elongate and perpendicular to the second blade and third blade, the second blade and the third blade are spaced equidistantly apart and bisect the first blade, and the first blade, the second blade, and the third blade, in use, pass together through the slots of the plate.

11. The apparatus as claimed in claim 10, wherein the apparatus comprises a housing containing the plate and the bag opener.

12. The apparatus as claimed in claim 10, wherein the apparatus comprises a conveyor for the plastic liner bag.

13. The apparatus as claimed in claim 12, wherein the apparatus comprises a pusher device arranged to move the plastic liner bag from the conveyor to the plate.

14. The apparatus as claimed in claim 10, wherein the apparatus comprises a bag holding means configured to contact and engage the plastic liner bag when on the plate.

15. The apparatus as claimed in claim 14, wherein the bag holding means comprises one or more vacuum gripping devices.

16. The apparatus as claimed in claim 10, wherein the one or more aeration spears is configured with an outer housing configured as an annular ring and including a series of vacuum points.

17. The apparatus as claimed in claim 10, wherein the apparatus includes a displacement means for the one or more aeration spears, and the displacement means is configured to move the aeration spears substantially vertically downwards.

18. The apparatus as claimed in claim 10, wherein the plate is formed from three or more segments, and the first slot, the second slot, and the third slots are formed between adjacent segments.

19. The apparatus as claimed in claim 18, wherein an edge or side of each segment is hinged.

20. The apparatus as claimed in claim 10, wherein the plate is mounted to a frame including a displacement means, and the plate is configured to be displaced vertically downwards relative to the bag opener.

21. The apparatus as claimed in claim 10, wherein the first blade, the second blade, and the third blades of the bag opener are mounted to a frame, and the bag opener comprises a displacement means that is operative on the frame.

22. The apparatus as claimed in claim 20, wherein the bag opener is configured to be displaced vertically upwards relative to the plate.

23. The apparatus as claimed in claim 10, wherein the apparatus comprises a control system including a programmable logic controller (PLC), and the PLC receives inputs from sensors provided to the apparatus.

* * * * *